Apr. 24, 1923.

E. I. BOWE 1,453,124

FAN CONTROL FOR MOTOR VEHICLES

Filed Dec. 17, 1921

Inventor
Elbert I. Bowe

By Watson E. Coleman
Attorney

Patented Apr. 24, 1923.

1,453,124

UNITED STATES PATENT OFFICE.

ELBERT I. BOWE, OF HURON, SOUTH DAKOTA.

FAN CONTROL FOR MOTOR VEHICLES.

Application filed December 17, 1921. Serial No. 523,066.

*To all whom it may concern:*

Be it known that I, ELBERT I. BOWE, a citizen of the United States, residing at Huron, in the county of Beadle and State of South Dakota, have invented certain new and useful Improvements in Fan Controls for Motor Vehicles, of which the following is a specification, reference being had to the accompanying drawings.

This invention relates to attachments for motor vehicles and has for its object the provision of means whereby the fan belt of the motor may be tightened or slackened from the dash while the vehicle is in motion whereby the engine may be allowed to heat up to a certain desired extent in cold weather or whereby the fan may be rendered fully operative to exert its entire cooling effect.

It is well known that in winter driving the common practice is to place in the radiator some non-freezing solution and to use a cover over the radiator and hood, the cover being provided with an adjustable opening to admit sufficient air to cool the radiator to a proper running temperature. In actual practice there are several disadvantages to this system, one of which is that the opening is sufficient when the car is traveling in a certain direction, say against the wind, but if the car turns and travels sideways to the wind or with the wind, insufficient air is admitted through the opening in the cover and the engine consequently heats up very rapidly which results in interference with the proper action of the engine and which also causes boiling away of the alcohol or other chemical used as a non-freezing agent in the radiator. If the opening in the cover is sufficiently large that the above mentioned contingency does not occur, the result is that the water stays too cool which causes an undue fuel consumption. With these various facts in view I have designed the present invention which comprises easily operable means mounted upon the dash and controllable by the operator whereby to render the fan operative or inoperative at will so that the cooling effect may be readily controlled to meet any and all conditions.

Another object is the provision of a device of this character which may be so constructed and modified that it may be used upon engines of various types depending upon the different mountings of the fan supports thereof.

An additional object is the provision of a device of this character which will be simple and inexpensive in manufacture and installation, highly efficient in use, durable in service and a general improvement in the art.

With the above and other objects and advantages in view, the invention consists in the details of construction to be hereinafter more fully described and claimed, and illustrated in the accompanying drawings, in which:

Figure 1:
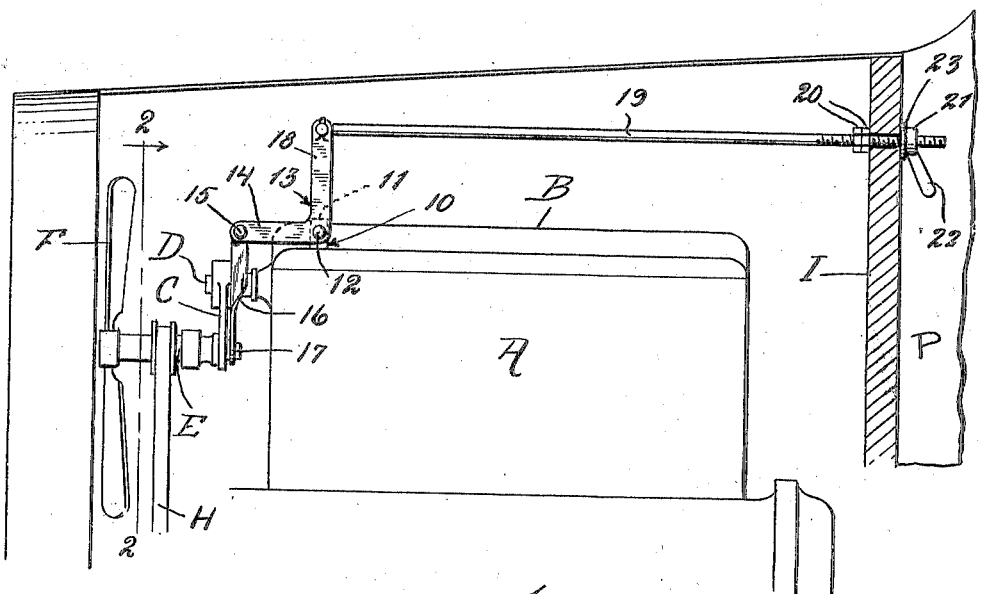
Figure 1 is a somewhat diagrammatic side elevation of an automobile engine of the Dodge type equipped with my device.
Figure 2:
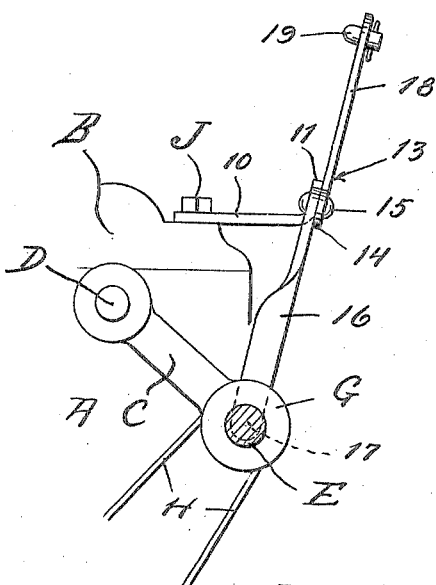
Figure 2 is a front elevation thereof.

Referring more particularly to the drawings, the letter A designates a motor which is here illustrated as being of that type used in Dodge automobiles, B designates the detachable cylinder head, C designates the arm pivoted at D and carrying the shaft E upon which is mounted the fan F and also carrying a pulley G about which is trained the pulley drive belt H. The letter I designates the dash usually forming the front wall of the cockpit P of the vehicle.

In carrying out my invention I provide a supporting bracket 10 which is disposed upon one forward corner of the cylinder head B and which is formed with a suitable hole for the passage of one of the cylinder bolts J whereby the bracket may be rigidly secured in position. This bracket has its free end upturned, as indicated at 11. Pivoted at 12 upon this end 11 is an angle lever 13 with the free end of the arm 14 of which is pivotally connected, at 15, a depending link 16 which is connected with the arm C by a pivot bolt 17.

Pivotally connected with the upper end of the arm 18 of the angle lever is a rearwardly extending rod 19 which has its free end threaded and extending through the dash I. Screwed upon this threaded end are two nuts 20. The purpose of these nuts is to form a stop for limiting the movement of the rod 19 in one direction. Threaded upon the end of the rod which projects through the dash is a nut 21 having a lever handle 22 and bearing against a washer 23.

Assuming that the device has been constructed as above described and as illustrated, the operation is as follows: Under normal conditions, that is when the full cooling effect of the fan is desired, the nut 21 is screwed up tightly to draw the rod 19 rearwardly as far as possible whereby to rock the angle lever 13 upon its pivot to exert an upward pull on the link 16 which will hold the arm C elevated with the fan belt H under tension. When driving in cold weather and it is desired to allow the engine to heat up to a certain extent, the operator unscrews the nut 21 whereby the weight of the arm C and the fan and other parts carried thereby will cause it to move downwardly, the rod 19 of course moving forwardly. The downward movement of the arm C naturally results in slackening of the fan belt so that the fan will become idle. Instead of permitting the fan to become entirely idle it is possible to adjust the nut 21 to such an extent as to permit the arm C to descend to a degree sufficient to permit slippage of the fan belt while at the same time it will operate to rotate the fan at a diminishing speed. In this way it will be seen that whenever it is advisable, the cooling action of the fan may be cut out entirely in a very simple manner and without it being necessary for the operator to leave his seat. Owing to the simplicity of the construction it is apparent that there is nothing to get out of order and that the device should consequently have a long life and satisfactorily perform all the functions for which it is intended.

While I have shown and described the device as used in association with the fan of a Dodge automobile, this is for purposes of explanation only, as I do not in any way desire to limit the application of the invention to an engine of this type as it may be readily adapted for use in connection with many engines. It is, however, necessary to make certain modifications in the form of the supporting bracket and its particular connection with the engine for the reason that some engines do not have removable cylinder heads and therefore do not have bolts in the same location as the Dodge engine which are capable of holding the bracket. It is, therefore, to be distinctly understood that I reserve the right to make such changes and all other changes in the form, construction and arrangement of parts as will not depart from the spirit of the invention or the scope of the sub-joined claims.

Furthermore, it is obvious that the mechanism heretofore described may be used with a tractor, truck, automobile, ice harvesting machine, aeroplane, or any other motor driven vehicle which might use an explosive motor for power in cold temperatures, and in this case, of course, the adjusting nut 21 would not be disposed upon the dash but at any other desired location which would be within easy reach of the operator.

I claim:—

1. Means for controlling the temperature of internal combustion engines of vehicles comprising the combination with a fan for directing cooling air against the engine, and a drive belt for said fan driven from the engine, of a shiftable arm supporting the fan, and means operable from the cockpit of the vehicle for shifting said arm to tension or loosen said belt.

2. Means for controlling the temperature of internal combustion engines of vehicles comprising the combination with a fan for directing cooling air against the engine, and a drive belt for said fan driven from the engine, of a shiftable arm supporting the fan, means operable from the cockpit of the vehicle for shifting said arm to tension or loosen said belt, and means for limiting the movement of the last named means in a direction to shift the arm to tension said belt.

3. Means for controlling the temperature of internal combustion engines of vehicles comprising the combination with a fan for directing cooling air against the engine, and a drive belt for said fan driven from the engine, of a shiftable arm supporting the fan, means operable from the cockpit of the vehicle for shifting said arm to tension or loosen said belt embodying a bell crank lever pivotally mounted upon said engine, a link connecting said arm and one arm of the bell crank lever, and an operating arm pivotally connected with the other arm of the bell crank lever and having its rear end portion extending into the cockpit of the vehicle.

4. Means for controlling the temperature of internal combustion engines of vehicles comprising the combination with a fan for directing cooling air against the engine, and a drive belt for said fan driven from the engine, of a shiftable arm supporting the fan, means operable from the cockpit of the vehicle for shifting said arm to tension or loosen said belt embodying a bell crank lever pivotally mounted upon said engine, a link connecting said arm and one arm of the bell crank lever, and an operating arm pivotally connected with the other arm of the bell crank lever and having its rear end portion extending into the cockpit of the vehicle through the dash thereof, the rear end of said rod being externally screw-threaded and being provided with an adjustable stop member adapted to abut the front face of the dash and with a lever nut engaging the rear face of the dash.

5. Means for controlling the temperature of the internal combustion engines of vehicles comprising the combination with a fan for directing cooling air against the engine and a drive for the fan including friction clutch elements, means operable in the cockpit of the vehicle for adjustably controlling the speed of the fan or to render the same inoperative, including a member for shifting one of said clutch elements to increase or decrease the frictional engagement between the elements.

In testimony whereof I hereunto affix my signature.

ELBERT I. BOWE.